United States Patent [19]
Kapich

[11] Patent Number: 5,924,286
[45] Date of Patent: Jul. 20, 1999

[54] HYDRAULIC SUPERCHARGER SYSTEM

[76] Inventor: Davorin D. Kapich, 3111 Serrano Dr., Carlsbad, Calif. 92009

[21] Appl. No.: 09/020,776

[22] Filed: Feb. 9, 1998

Related U.S. Application Data

[63] Continuation-in-part of application No. 09/002,602, Jan. 5, 1998, abandoned.

[51] Int. Cl.$^6$ .............................. F02B 37/10; F02B 39/08
[52] U.S. Cl. ............................................ 60/608; 123/565
[58] Field of Search ...................... 60/607, 608; 123/561, 123/565

[56] References Cited

U.S. PATENT DOCUMENTS

| | | | |
|---|---|---|---|
| 3,869,866 | 3/1975 | Timoney | 60/608 |
| 4,285,200 | 8/1981 | Byrne . | |
| 5,471,965 | 12/1995 | Kapich . | |

FOREIGN PATENT DOCUMENTS

| | | | |
|---|---|---|---|
| 3008181 | 9/1981 | Germany | 60/608 |
| 3-249328 | 11/1991 | Japan | 60/608 |

*Primary Examiner*—Michael Koczo
*Attorney, Agent, or Firm*—John R. Ross; John R. Ross, III

[57] ABSTRACT

A supercharger system in which an hydraulic driven supercharger shares an hydraulic power system with at least one other hydraulic driven device. The system includes a very high speed radial inflow hydraulic turbine drive driving a compressor for supplying compressed air to an internal combustion engine. Pressurized hydraulic fluid for driving a supercharger hydraulic turbine is provided by a first pump driven by the engine shaft. A second pump provides a higher pressure hydraulic fluid flow for driving at least one other device, such as a power steering device. In a preferred embodiment, when the hydraulic turbine is not needed at high engine speed because sufficient air is provided by a turbosupercharger, a bypass valve is opened by a controller to unload the hydraulic pump and then the controller causes a clutch to decouple the supercharger hydraulic pump from the engine shaft. Each of several preferred embodiments utilize a plastic-metal turbine wheel in which the plastic portion of the wheel other than the blades is solidly anchored within a metal containing wheel. The superchargers provided by the present invention produce immediate response to engine demand for increased combustion air and will dramatically reduce smoke emission during low speed acceleration of bus and truck engines as well as greatly improve engine efficiency. In another preferred hybrid embodiment, the hydraulic turbine drive is mounted on the same shaft with an exhaust driven turbine, and both drive the a compressor providing compressed air to the engine. In a preferred embodiment a novel nozzle body is disclosed having an increased number of nozzles at angles such as to provide substantial exit hole overlapping at nozzle exits to produce an increase of about 7 percent over similar prior art hydraulic turbine driven superchargers.

11 Claims, 14 Drawing Sheets

FIG. 18
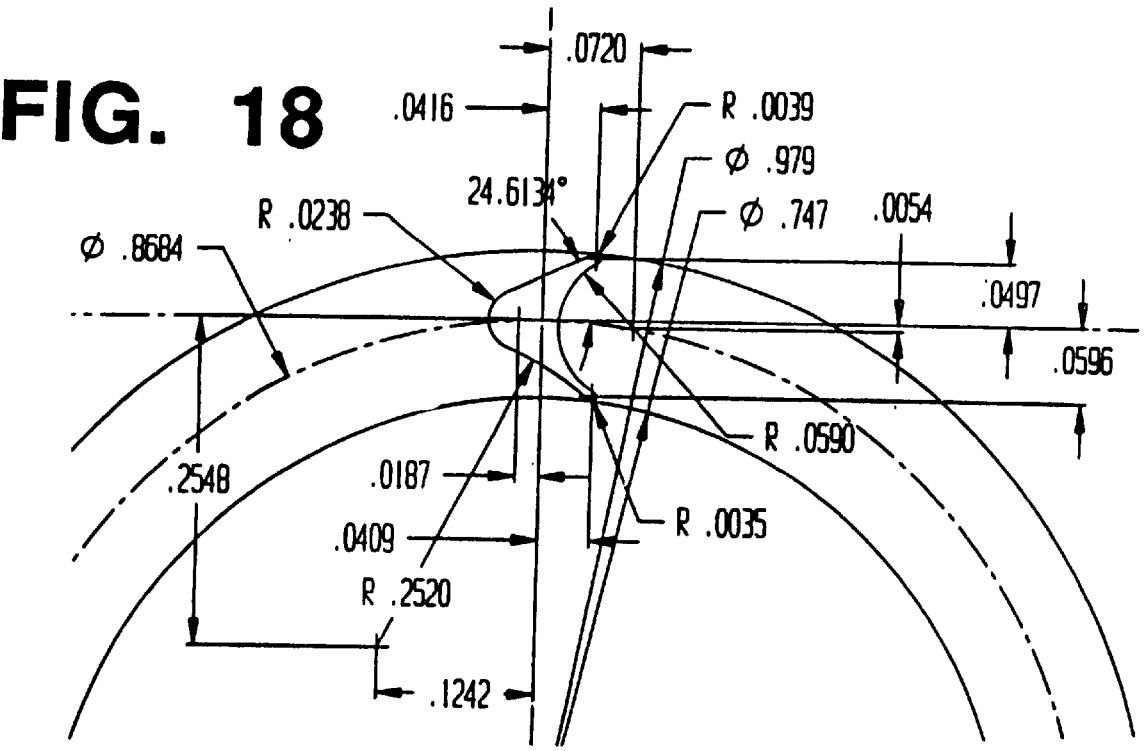
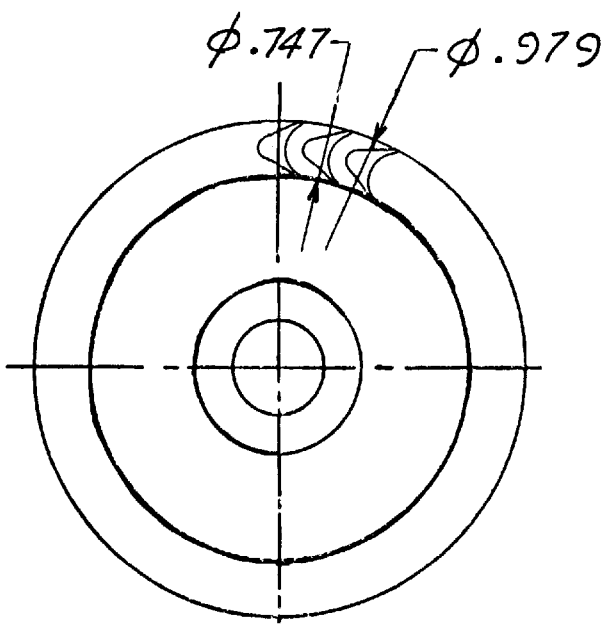
FIG. 19

5,924,286

HYDRAULIC SUPERCHARGER SYSTEM

This invention relates to supercharger systems for internal combustion engines. This is a Continuation-In Part application of Ser. No. 09/002,602 filed Jan. 5, 1998, now abandoned.

BACKGROUND OF THE INVENTION

Superchargers are air pumps or blowers in the intake system of an internal combustion engine for increasing the mass flow rate of air charge and consequent power output from a given engine size. Turbosuperchargers (normally called turbochargers) are engine exhaust gas turbine driven superchargers. When superchargers are driven mechanically from the shaft of the internal combustion engine, a speed increasing gear box or belt drive is needed. Such superchargers are limited to a relatively low rotating speed and are large in size. Paxon Blowers and Vortech Engineering Co. are marketing such superchargers. Fixed gear ratio superchargers suffer from two very undesirable features: 1) there is a sharp decrease in boost pressure at low engine RPM because boost pressure goes generally to the square of the speed of rotation, and 2) it is generally difficult to disconnect the supercharger from the engine when the supercharger is not needed.

Applicant was granted on Dec. 5, 1995 a patent (U.S. Pat. No. 5,471,965) on a very high speed radial inflow hydraulic turbine. FIG. 12 of that patent discloses the hydraulic turbine driven blower used in combination with a conventional turbocharger to supercharge an internal combustion engine. In that embodiment the output of the hydraulic driven compressor was input to the compressor of the conventional turbocharger. In all the embodiments shown in the '965 patent, the pump delivering high pressure hydraulic fluid to the hydraulic turbine was driven directly off the engine shaft. At high speeds when the exhaust driven turbosupercharger is fully capable of supplying sufficient compressed air to the engine, a bypass valve unloaded the hydraulic fluid pump but it continued to pump hydraulic fluid through the bypass valve which is a waste of engine horse power.

Another hybrid supercharger is disclosed in U.S. Pat. No. 4,285,200 issued to Byrne on Aug. 25, 1981. That patent disclosed a compressor driven by an exhaust driven turbine and a hydraulic driven turbine, the compressor and both turbines being on the same shaft. That turbine was an axial flow turbine and the turbine was driven with engine oil. With this design oil foaming can be a problem. U.S. Pat. No. 5,471,965 and U.S. Pat. No. 4,285,200 are incorporated herein by reference.

Many motor vehicles being produced at the time of the filing of this application utilize high pressure fluid to drive devices such as power steering equipment. These devices typically are designed for higher pressure hydraulic fluid than the preferred hydraulic fluid pressures needed for hydraulic fluid driven superchargers.

There is a great need for additional supercharging of present turbocharged diesel engines. In the low RPM range, the currently available turbocharging systems are not very effective in producing sufficient engine manifold pressure and power, required for satisfactory vehicle acceleration and exhaust smoke reduction. This applies especially to "stop and go" type services, such as city buses and trash collecting trucks. A thermodynamic cycle analysis of a typical truck turbodiesel engine shows that even with modest 2 to 3 psi supercharging applied in series to the inlet of the existing turbocharger compressor in the low engine RPM range, the existing turbocharger pressure ratio increases exponentially mainly due to a large increase in turbocharger turbine power.

What is needed, is a better supercharger system.

SUMMARY OF THE INVENTION

The present invention provides a supercharger system in which a hydraulic driven supercharger shares a hydraulic power system with at least one other hydraulic driven device. The system includes a very high speed radial inflow hydraulic turbine drive driving a compressor for supplying compressed air to an internal combustion engine. Pressurized hydraulic fluid for driving a supercharger hydraulic turbine is provided by a first pump driven by the engine shaft. A second pump provides a higher pressure hydraulic fluid flow for driving at least one other device, such as a power steering device. In a preferred embodiment, when the hydraulic turbine is not needed at high engine speed because sufficient air is provided by a turbosupercharger, a bypass valve is opened by a controller to unload the hydraulic pump and then the controller causes a clutch to decouple the supercharger hydraulic pump from the engine shaft. Each of several preferred embodiments utilize a plastic-metal turbine wheel in which the plastic portion of the wheel other than the blades is solidly anchored within a metal containing wheel. The superchargers provided by the present invention produce immediate response to engine demand for increased combustion air and will dramatically reduce smoke emission during low speed acceleration of bus and truck engines as well as greatly improve engine efficiency. In another preferred hybrid embodiment, the hydraulic turbine drive is mounted on the same shaft with an exhaust driven turbine, and both drive the a compressor providing compressed air to the engine. In a preferred embodiment a novel nozzle body is disclosed having an increased number of nozzles at angles such as to provide substantial exit hole overlapping at nozzle exits to produce an output increase of about 7 percent over similar prior art hydraulic turbine driven superchargers.

BRIEF DESCRIPTION OF THE DRAWINGS

FIG. 18 is a drawing showing the detail dimensions of turbine blades used with the nozzle body shown in FIGS. 16 and 17.

FIG. 19 is a drawing showing the positions of the turbine blades on the turbine wheel.

DETAILED DESCRIPTION OF PREFERRED EMBODIMENTS

Preferred embodiments of the present invention are described by reference to the drawings.

Turbine Drive

A prior art turbine drive is shown in FIGS. 1, 2, 3 and 4 which are extracted from U.S. Patent '965.

Turbine Wheel

Turbine 61 with a wheel of only 0.800 inch diameter is capable of generating 9.6 HP at 69,750 RPM, with pressure differentials of 930 psi and having the capability of operating at the fluid temperatures of 150 to 250 degrees Fahrenheit.

Figure 9:
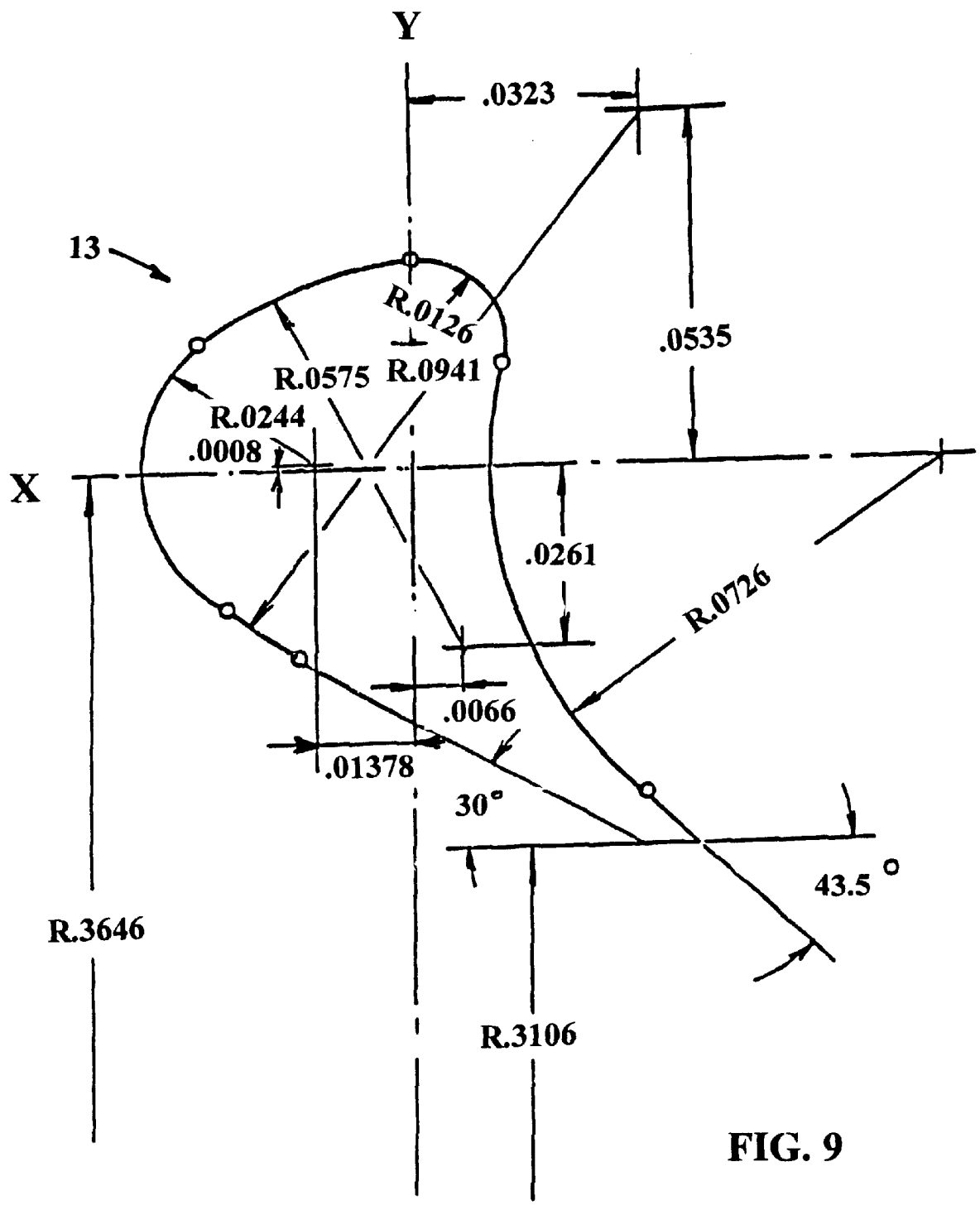
FIG. 9 shows blade dimensions.

Turbine drive 8 includes turbine wheel 11 with 27 turbine blades 31 which are preferably formed in an injection molding process. The plastic is pressure injected into a mold containing a containing wheel 12 (which is a metal such as steel) forming an integral assembly of plastic turbine wheel 11, metal wheel 12 and plastic turbine blades 31. The metal containing wheel 12 is precisely centered into the turbocharger shaft 14 and held axially by self locking steel fastener 17. Compressive load generated by the self locking steel fastener 17 is sufficient to facilitate the torque transfer from the metal containing wheel 12 into the turbocharger shaft 14 under all anticipated torque loads, fluid temperatures and rotating speeds. During the normal operation the temperature of hydraulic oil is usually in the range of 150 to 250 degrees Fahrenheit which expands the metal containing wheel 12 axially slightly more than the self locking steel fastener 17 and the turbocharger shaft 14, thus increasing the compressive load in the metal containing wheel 12 and the torque transfer capability slightly above the cold assembly condition. The centrifugally and thermally induced stresses in the plastic turbine wheel 11 which is solidly anchored inside the metal containing wheel 12 are to a great extent being absorbed by the metal containing wheel 12. Blade dimensions are shown in FIG. 9. As indicated on FIG. 3 and FIG. 1, the plastic turbine blades 31 are of the radial inflow type with rounded leading edges to minimize the erosion tendency sometime caused by very high hydraulic oil velocity as combined with sharp, thin leading edges. The radial inflow type blading geometry allows, after the blades are cast, the plastic mold to be withdrawn axially out from the blades. The blades of the turbine wheel are preferably made of high strength thermoplastic material, Polysulfone which is pressure injected into a mold holding the steel portion of the wheel which together form an integral metal/plastic turbine wheel and blade. Vespell, a high temperature plastic made by DuPont, has also been successfully tested for this application.

Turbine Parts and Its Operation

Turbine discharge housing 22 is solidly bolted by six bolts 29 to the turbine inlet housing 21 which is solidly bolted by a series of bolts at 35 to the commercially supplied (T04 form Turbonetics) turbocharger housing 41. Turbine nozzle ring 18 preferably made from Vespel is held in a precise axial and radial position by the turbine inlet housing 21 and the turbine discharge housing 22. (Nozzle ring 18 could also be made from brass or any of several other similar metals.) Nozzle ring 18, inlet housing 21 and discharge housing 22 together define toroidal inlet cavity 32. The high oil pressure contained inside inlet cavity 32 is sealed by O-Ring 24 and O-Ring 25 which prevent any leakage from inlet cavity 32 to the discharge cavity 34 along the contact surfaces between turbine nozzle ring 18, turbine inlet housing 21 and turbine discharge housing 22. A substantial portion of the inside diameter of the turbine nozzle ring 18 is supported radially by matching diameters of turbine inlet housing 21 and turbine discharge housing 22 which restrain radial deformation of the turbine nozzle body 18 and to a great degree absorb inwardly compressive pressure generated by the high pressure hydraulic fluid contained inside inlet cavity 32. The axial dimension of the turbine nozzle ring 18 is precisely matched with the axially allowable space between turbine discharge housing 22 and turbine inlet housing 21. At normal operating temperatures the turbine nozzle ring 18 expands slightly more than the matching surfaces of turbine inlet housing 21 and turbine inlet housing 22 which essentially restrain the axial expansion of the turbine nozzle ring 18 and produces a moderate axial compressive stress in the turbine nozzle ring 18. Commercially supplied sliding seal ring 16 provides the oil seal between the commercially supplied turbocharger housing 41 and the turbocharger shaft 14. O-Ring 26 seals the relatively low oil pressure around the turbocharger shaft 14 from leaking to ambient. O-Ring 23 seals the high oil pressure contained in inlet cavity 32 from leaking to ambient.

Figure 4:
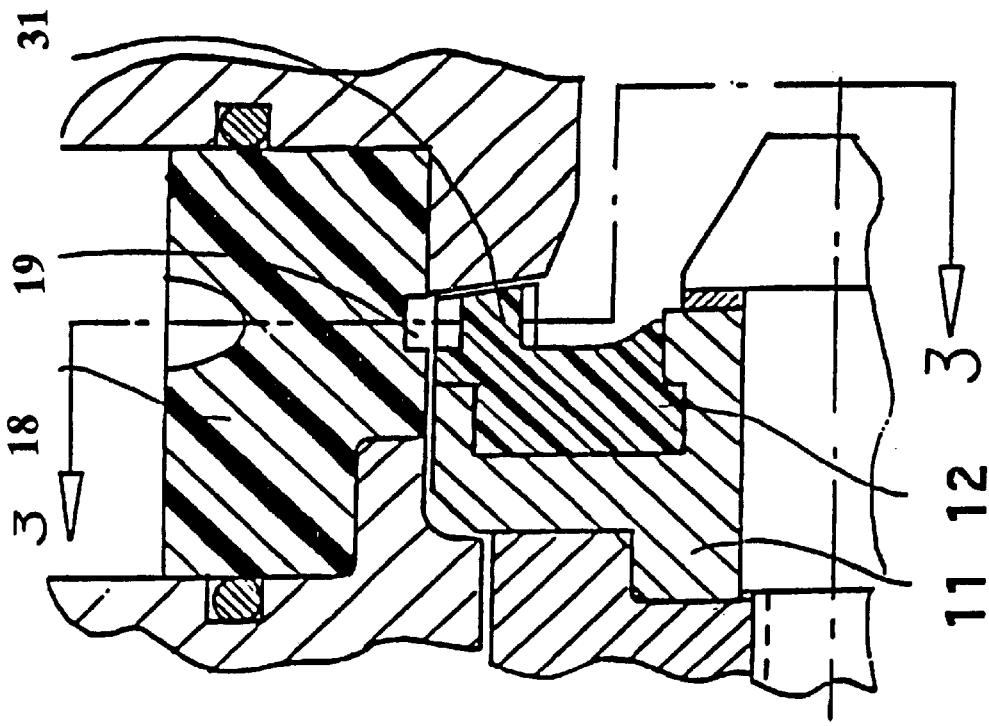
FIGS. 3 and 4 are drawings showing views of the nozzle arrangement of the turbine drive shown in FIG. 1.
Figure 3:
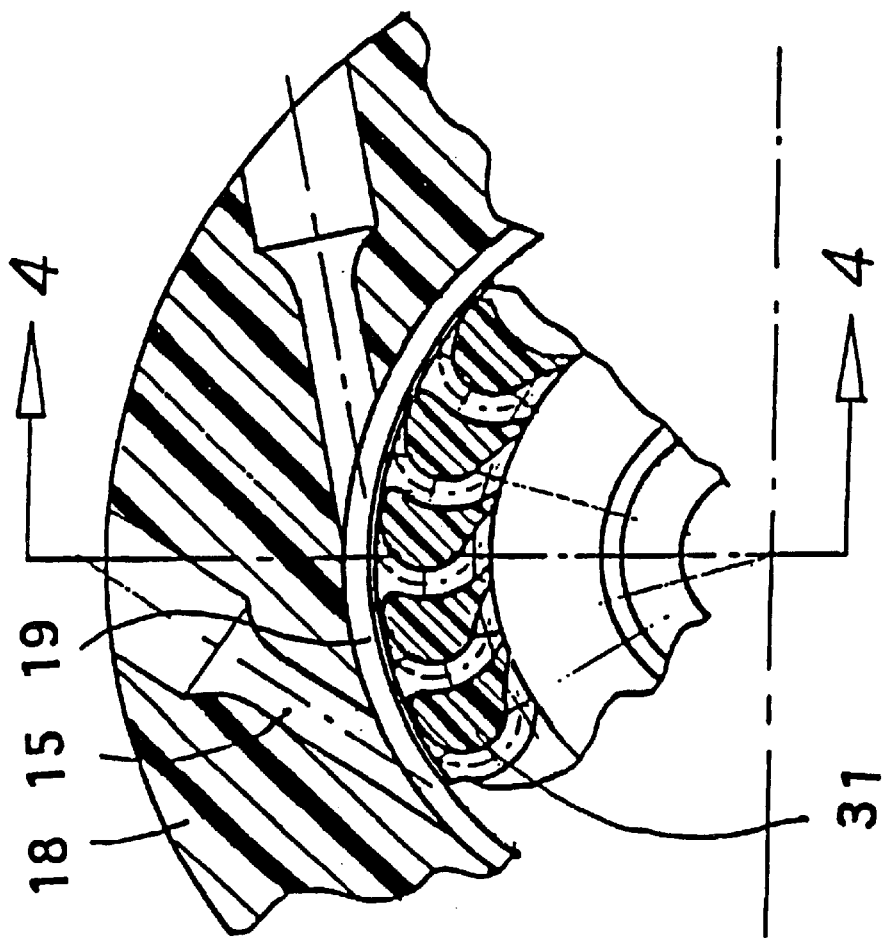

As indicated in FIGS. 3 and 4, in this embodiment sixteen turbine nozzles 15 are drilled in a radial plane, through the turbine nozzle ring 18 at an angle of 11 degrees with the tangent to a circle of the plastic turbine blades 31 outer diameter. The center lines of the turbine nozzles 15 positioned in a radial plane cause high pressure hydraulic fluid to expand radially inward from the inlet cavity 32 through turbine nozzles 15 into the vaneless passage 19 and into the inlet of the plastic turbine blades 31 where the hydraulic fluid momentum is converted into shaft power by well known principles. FIG. 3 shows the plan view of the exit portion of the turbine nozzles 15 as viewed in the planes 3—3 in FIG. 4. FIG. 4 shows a section through the nozzle ring 18 along the plane 4—4 in FIG. 3 High hydrodynamics efficiency of nozzles 15 is attributed to the particular combination of round cross sectioned turbine nozzles 15 and the gradual change in the cross section of the flow area along the centerline axis of the individual turbine nozzles 15 as shown in FIG. 3. The sixteen turbine nozzles 15 are positioned close to each other within the turbine nozzle ring 18 so as to produce minimum wakes of low velocity fluid in the vaneless passage 19 and turbine blades 31. Such wakes are considered to be generally harmful to the turbine hydraulic efficiency. Such nozzle positioning as shown in FIG. 3 and 4 maximizes the percentage of the turbine blades radial flow area occupied by the high velocity fluid relatively to the radial flow area occupied by the wakes. Also, providing vaneless passage 19 permits each of nozzles 15 to be drilled without drilling into other nozzles.

During operation high pressure oil (preferably at about 900 psi) enters the turbine via inlet channel 27. It flows into inlet cavity 32 which supplies the oil flow to the 16 nozzle passages 15 which are contained within turbine nozzle ring 18. The oil flow accelerates through nozzle passages 15 converting pressure energy into kinetic energy which is then utilized to provide a driving force to the plastic turbine blades 31. Oil exits from the plastic turbine blades 31 into exit cavity 34 and is discharged at low pressure through exit channel 33.

Design Details—Three Models

The hydraulic turbine drive described herein will provide very substantial advantages in cost and performance, especially for high speed turbine drives in the 50,000 to 150,000

RPM and 5 to 25 horsepower ranges. I provide in the following table design details applicable to three preferred embodiments recommended for use as drives for motor vehicle superchargers.

| MODEL | 1 | 2 | 3 |
|---|---|---|---|
| Engine Power (HP) | 140 | 220 | 300 |
| Turbonetics Compressor Model | TO4B S3 | TO60-1 | TO67 |
| Compressor Pressure Ratio | 1.52 | 1.52 | 1.52 |
| Hydraulic Turbine Power (HP) | 9.6 | 14.8 | 19.5 |
| Hydraulic Turbine Pressure (PSIG) | 930 | 1020 | 1130 |
| Hydraulic Turbine Flow (GPM) | 23.5 | 32.0 | 38.0 |
| Hydraulic Turbine Efficiency | 0.75 | 0.77 | 0.78 |
| Hydraulic Turbine Speed (RPM) | 69,750 | 64,500 | 62,500 |
| Hydraulic Turbine Wheel Dia. (mm) | 20 | 20 | 22 |
| Hydraulic Turbine Blade Height (mm) | 1.55 | 1.58 | 1.65 |
| Number of Nozzles | 8 | 8 | 12 |
| Nozzle Angle (DEG.) (measured from tangent) | 11 | 11 | 11 |
| Rotor Blade Angle (DEG.) | 28 | 28 | 28 |
| Number of Rotor Blades | 27 | 27 | 30 |

The above parameters are chosen for supercharging non-turbocharged engines. When supercharging similar size turbocharged engines the operating parameter requirements will be lowered appropriately using well known thermodynamic principals.

Alternate Turbine Arrangements

Figure 6:
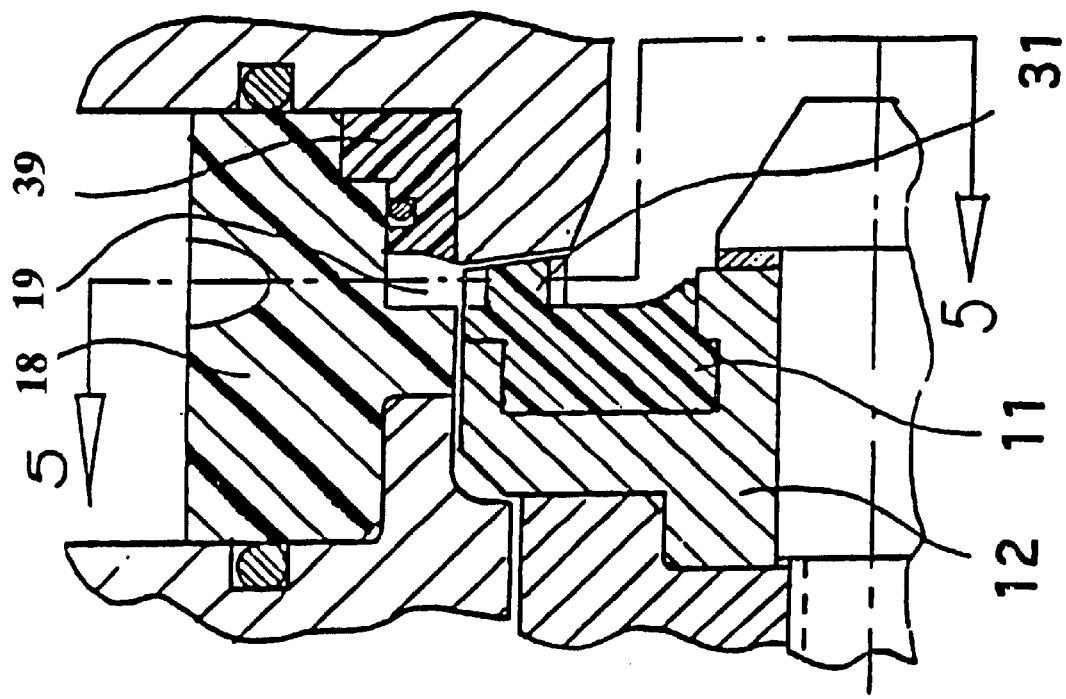
FIGS. 5 and 6 show an alternate arrangement similar to that shown in FIGS. 3 and 4.
Figure 5:
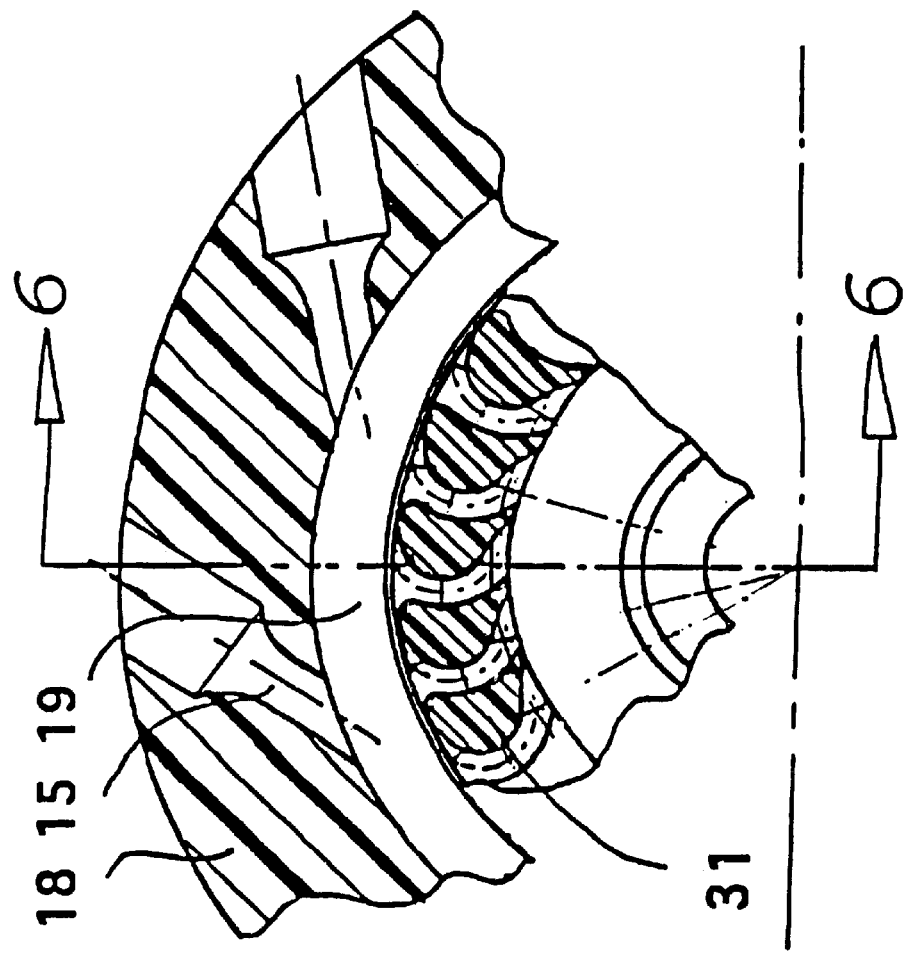

An alternate turbine arrangement is shown in FIGS. 5 and 6. This arrangement provides for better matching of the hydraulic turbine with different sizes of supercharging compressor wheels, without the necessity for changing basic turbine blades, tooling and nozzle tooling. FIG. 5 which represents section 5—5 in FIG. 6 shows the vaneless passage 19 having increased radial depth as compared to preferred embodiment shown in FIGS. 3 and 4. FIG. 6 which represents section 6—6 in FIG. 5 shows ring insert 39 forming conically slanted sidewall of vaneless passage 19, which decreases axial width of vaneless passage 19 with decreasing radius. The plastic turbine blades 31 are axially shorter, matching the width of the vaneless passage 19 at the exit of the vaneless passage 19. The change in vaneless passage 19 width affects mainly the radial velocity component of the free vortex flow that is predominant in the vaneless passage 19. Since the tangential velocity component is governed by the law of conservation of momentum, it is inversely proportional to the change in radius and is generally not affected by the change in the width of the vaneless passage 19. By changing the radial velocity component at different rate than the tangential velocity component, the angle of velocity exiting the vaneless passage 19 will change with different width of ring inserts 39 and will affect the turbine operating speed at the point of maximum turbine power, which is one of the objectives of this alternate embodiment. With decreased width of vaneless passage 19, the hydraulic fluid will expand partially through the nozzles 15 and partially through the vaneless passage 19, which will affect the turbine pressure vs flow characteristics, which is another objective of this alternative embodiment.

Figure 8:
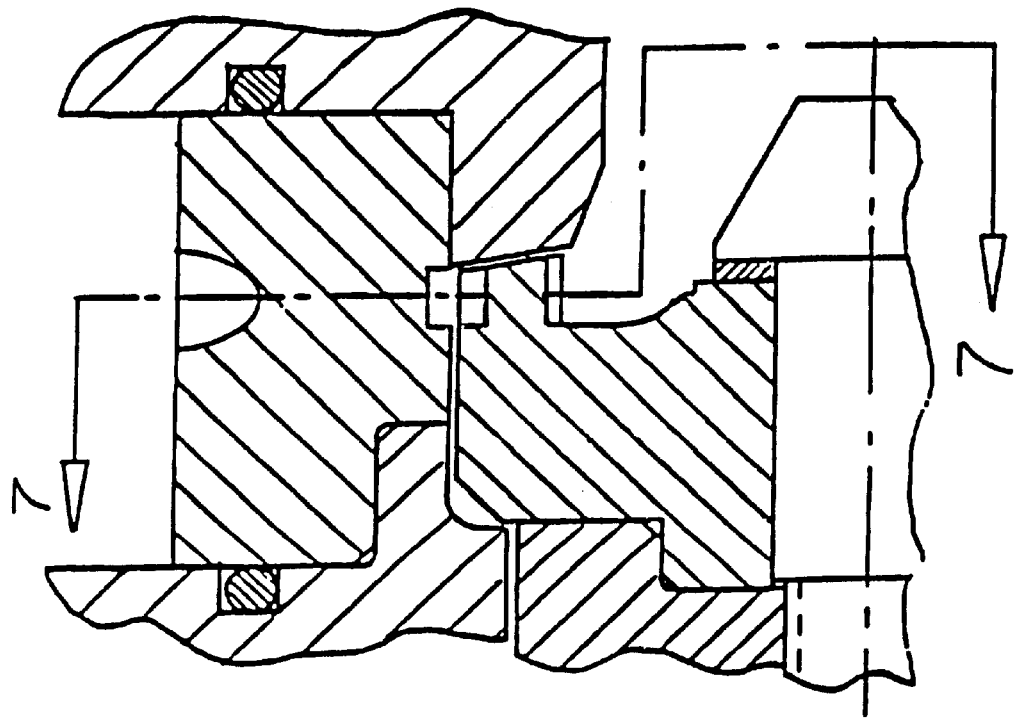
FIGS. 7 and 8 show views of an all metal turbine wheel.
Figure 7:
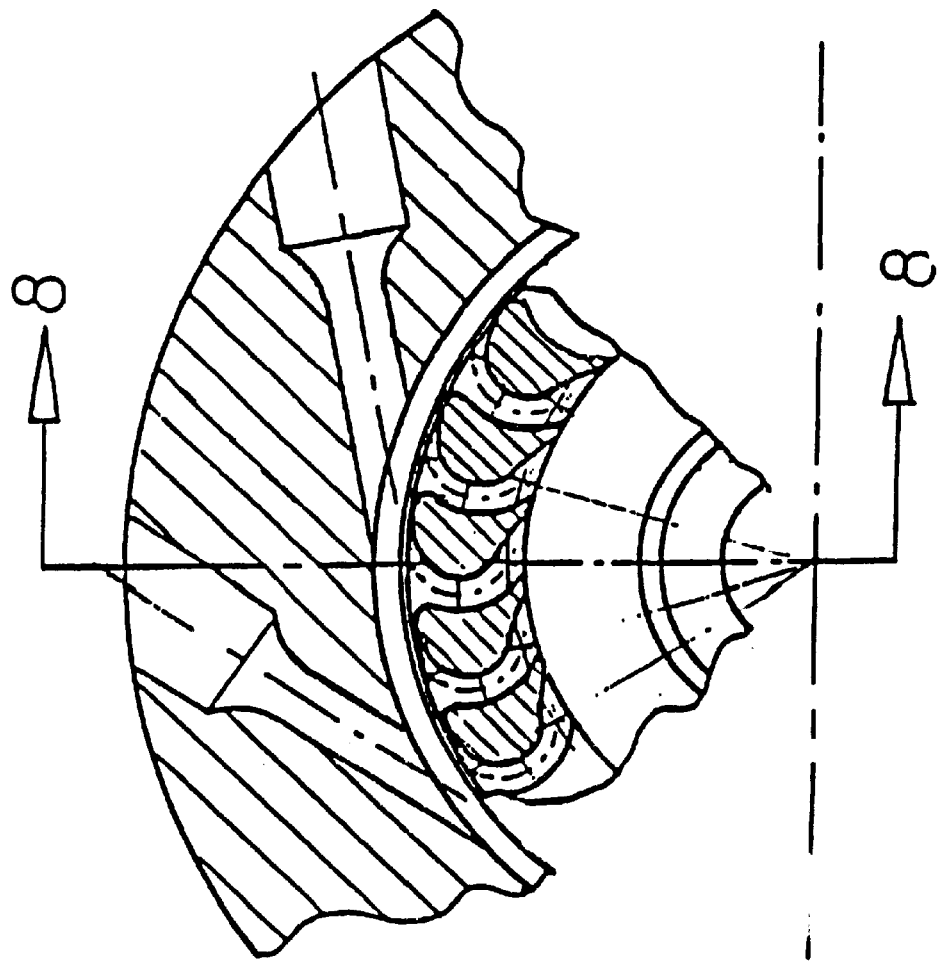

A solid metal wheel turbine is shown in FIGS. 7 and 8. My preferred metal is brass. The blades are machined. The wheel is more expensive than the metal-plastic wheel discussed above but service life could be considerably longer.

Drive for Supercharger

Figure 2:
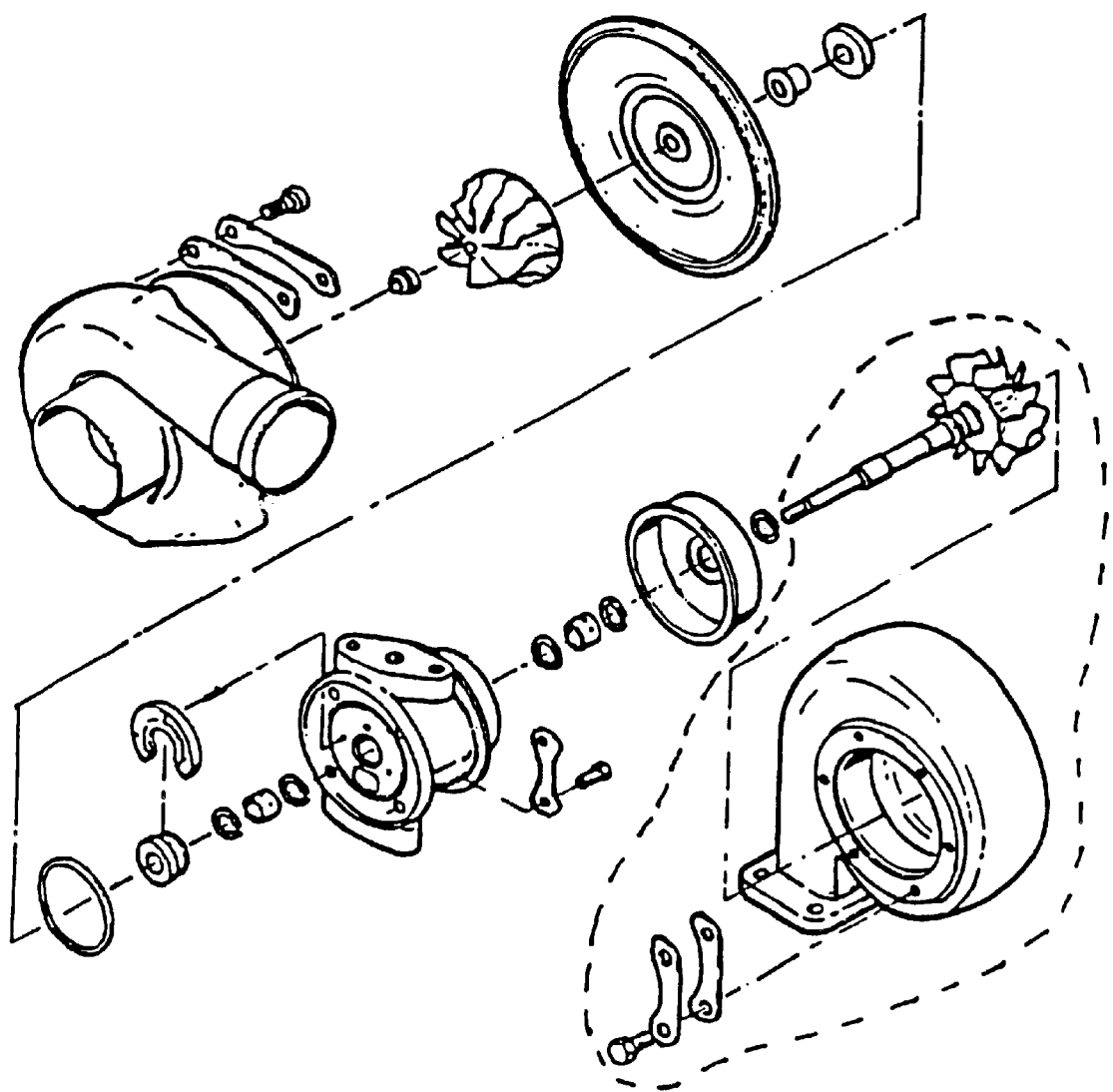
FIG. 2 is a drawing showing an exploded view of a prior art turbocharger.

The turbine described in detail herein is designed for use with the compressor and bearing assembly portion of the TO4B turbocharger, sold by Turbonetics Incorporated, 650 Flinn Avenue, Unit 6, Moorpark, Calif. A drawing of this model is shown in FIG. 2. The dashed line in FIG. 2 encircles the parts not used in a preferred embodiment of the present invention. The parts I use are individually available from the Turbonetics catalogs.

Hydraulic Supercharging System

Figure 10:
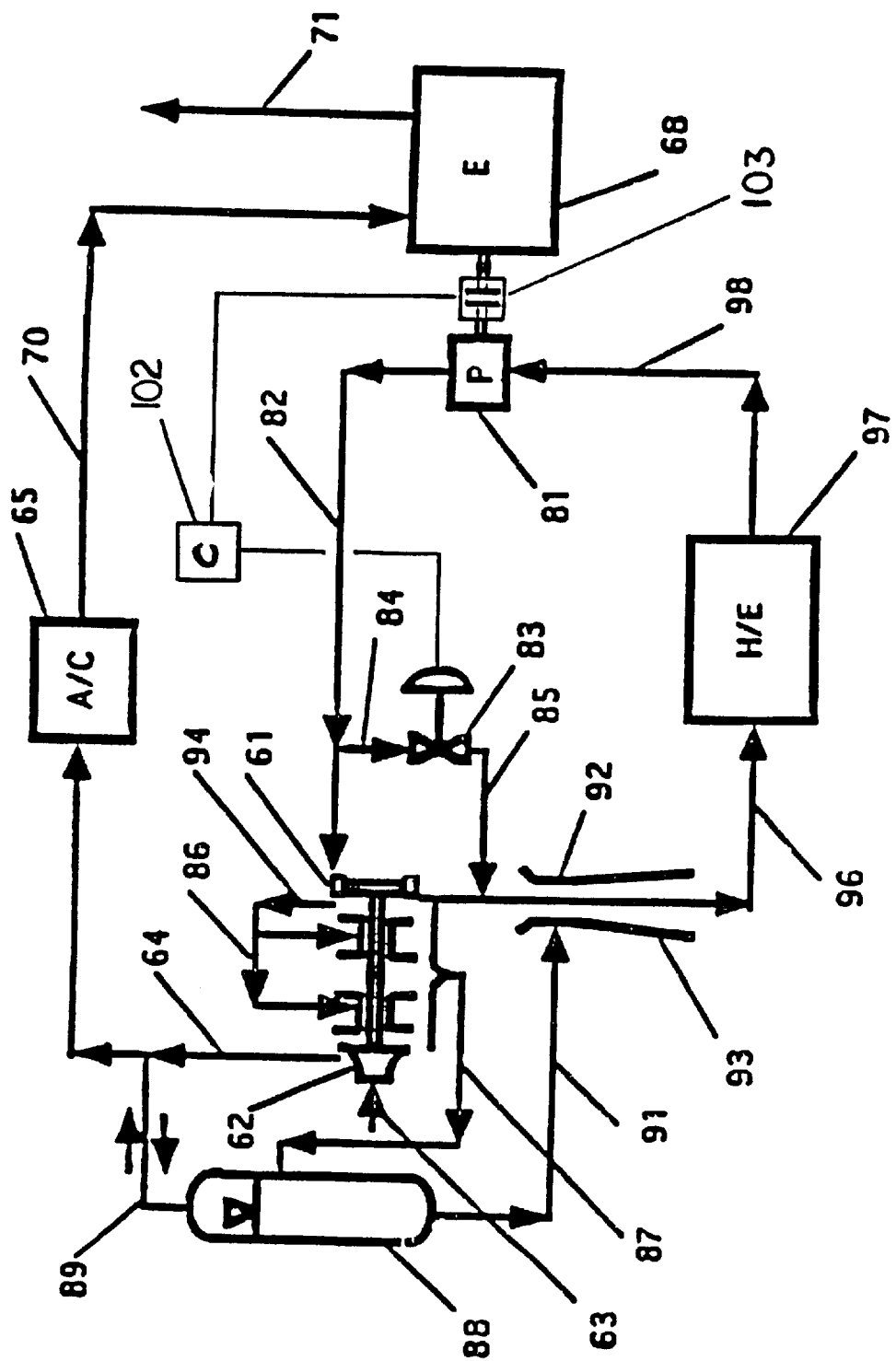
FIG. 10 is a layout of a hydraulic system utilizing my novel turbine drive.

FIG. 10 shows a one-stage supercharger hydraulic system. This arrangement is similar to FIG. 10 in my U.S. Patent '965 except I have added controller 102 and clutch 103. In this preferred embodiment, engine 68 is a standard Mazda RX-7 rotary engine producing useful mechanical power. Hydraulic pump 81 is driven by engine 68 and the pump is pressurizing, at the rate of about 27 gallons per minute, hydraulic fluid to a pressure of approximately 1000 psi into line 82 which channels the hydraulic fluid to turbine drive 8 and via line 84 to bypass valve 83. Hydraulic pump 81 is a commercially available hydraulic pump such as Parker Model H77. Supercharger compressor wheel 62 is a standard commercially available TO-4 compressor which is driven by turbine wheel 61 as shown in FIG. 10.

Bypass valve 83 when open allows hydraulic fluid to bypass turbine 61 and unloads hydraulic pump 81. To prevent unnecessary wear and friction losses of pump 81, when the high pressure hydraulic fluid is not needed, it is desirable to mechanically disconnect pump 81 from engine 68. This is accomplished with clutch 103. Such clutch is commonly used in driving hydraulic pumps and is commercially available from suppliers such as Northern Hydraulic Co. with offices in Burnsville Minn. In order to increase the useful life of clutch 103, it is desirable to connect and disconnect the pump under minimum pump load whenever possible. For this reason, controller 102 preferably causes bypass valve 83 to open a fraction of a second before clutch 103 disengages pump 81. Also, controller 102 causes bypass valve to close a fraction of a second after clutch 103 engages. These precautions minimize wear on clutch 103.

Also there are other important functions which are provided by sequential activation and deactivation of bypass valve 83 and pump 81 via clutch 103. When pump 81 is disengaged, virtually no oil flows through any oil lines. However, it is important that forced lubrication through lines 94 and 86 be established prior to high speed rotation of turbine 61. Previously described sequential closing of bypass valve 83 allows for free oil flow to bypass turbine 61 and establish full lubrication via lines 94 and 86 prior to high speed rotation of turbine 61 caused by closing bypass valve 83. During disengagement of pump 81, the sequence is reversed in that bypass valve 83 opens first which allows turbine 61 to slow down prior to disengagement of pump 81 via clutch 103 which in turn causes the stopping of forced lubrication via lines 94 and 86.

Turbine discharge line 94 is connected to bypass valve discharge line 85. The amount of flow from turbine wheel 61 discharge is reduced by the bearing lubricant flow of approximately 1.5 GPM which flows through line 86. The combined flow from the bypass valve 83 discharge and turbine wheel 61 net discharge flow are forced to flow through throat 92 of venturi nozzle 93. Throat 92 diameter is sized to provide a drop in static pressure at the throat 92 location of about 60 psi. This location serves as the return point for the lubricant flow supplied to supercharger bearings via line 86. The bearings drain line 87 is connected to expansion tank 88 which provides for thermal expansion of the hydraulic fluid and as a degassing point for the hydraulic fluid. The expansion tank is further connected via line 91 to the throat of venturi 93. Bearing lubricant flow from line 91 joins at that point the combined turbine discharge and bypass valve discharge flows, flowing further through the diffuser section of venturi nozzle 93 where about 80 percent of the throat 92 dynamic head of 60 psi is recovered, thus raising the static pressure in line 96 to about 50 psi above throat of venturi 93 static pressure.

The hydraulic fluid flows from line 96 into oil cooler 97 where the heat losses are rejected. Hydraulic fluid flows further via line 98 back into hydraulic pump 81. Pressurized air flowing through line 64 is typically aftercooled in the air to air aftercooler 65 where large amount of heat of compression is rejected to ambient. Relatively cool pressurized air is further charged into engine 68. Line 71 is the engine exhaust pipe. Bearing oil discharge is directed to expansion tank 88. Expansion tank 88 is vented into supercharger discharge line 64 which pressurizes expansion tank 88 to supercharger discharge line pressure.

Figure 11:
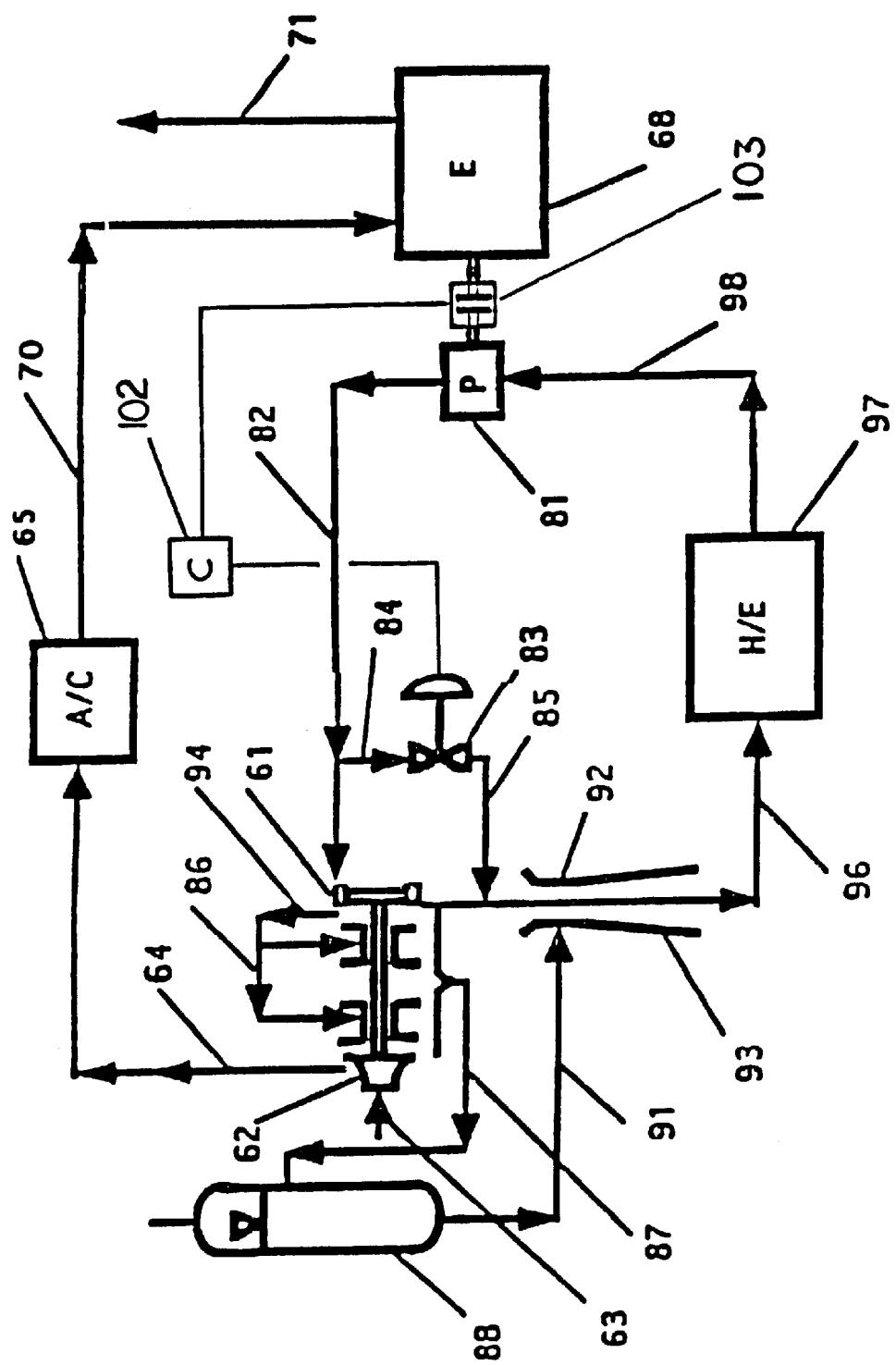
FIG. 11 is a modified version of FIG. 10.

FIG. 11 shows a configuration where tank 88 is vented to the atmosphere.

A very important advantage of the present invention over direct drive superchargers is that the supercharger compressed air flow and pressure in the present system can be controlled independent of engine speed. This is simply done by adjusting the bypass flow through valve 83. This permits much higher power at low speeds for motor vehicles and permits easy compensation for altitude changes in airplane engines.

Figure 12:
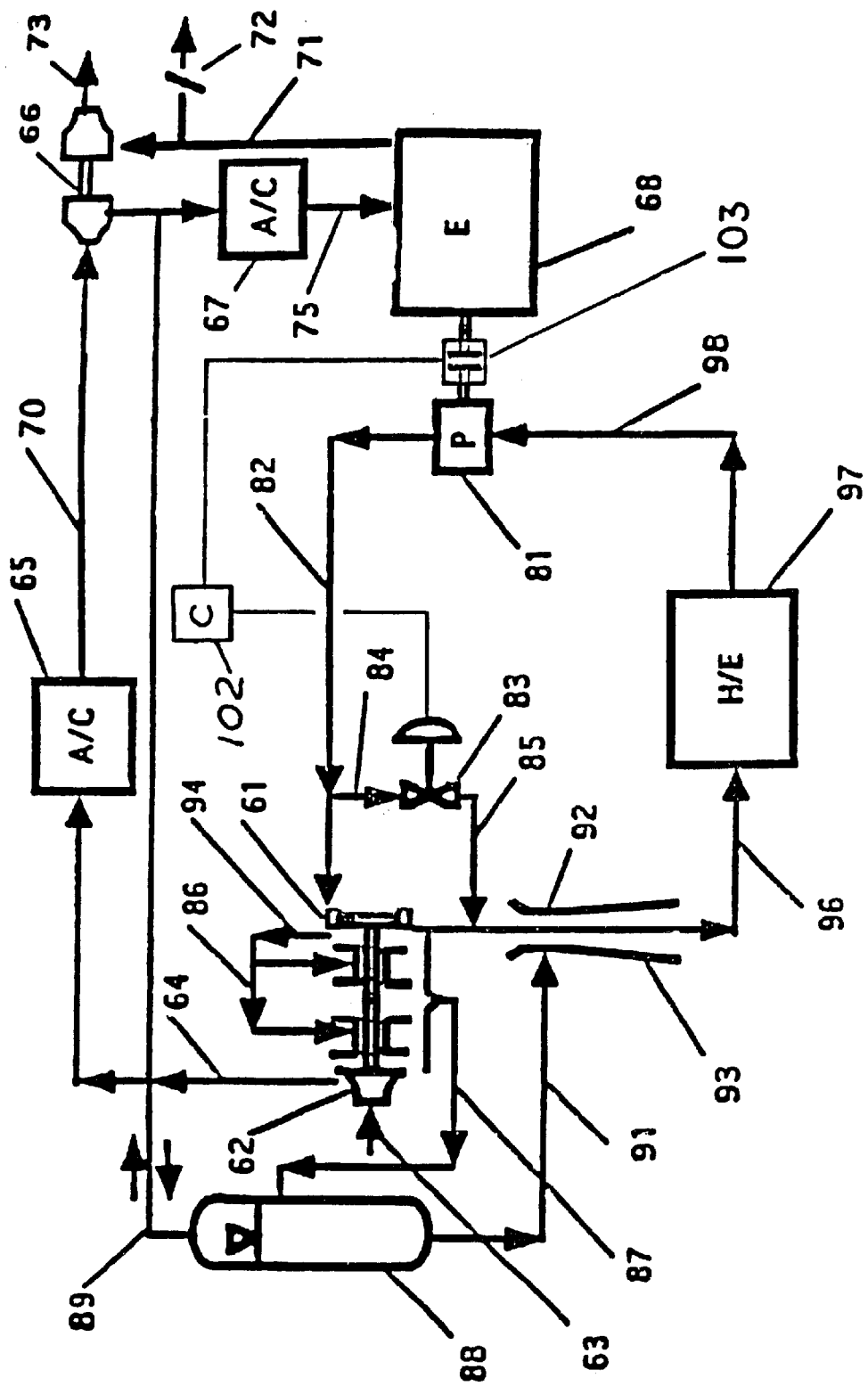
FIG. 12 is a layout similar to FIG. 11 including a turbocharger.

When multi-stage supercharging is desirable, such as in aircraft engine applications or in the case of high output engines, the expansion tank 88 can be vented into the discharge of the last stage supercharger. This will assure in the case of aircraft applications adequate hydraulic pump inlet pressurization even at higher altitudes. FIG. 12 shows such a case utilizing supercharger and turbocharger is series where line 89 is connected to the discharge line out of turbocharger 66. Second aftercooler 67 supplies cooled compressed air via line 75 into engine 68. Exhaust pipe 71 provides the turbine section of the turbocharger 66 with pressurized exhaust flow which after exiting turbocharger 66 turbine section flows further through line 73 to ambient or to another turbine or heat exchanger. Valve 72 provides for turbocharger 76 control to prevent overboosting engine 68.

The FIG. 11 configuration and the FIG. 12 configuration include the clutch and the controller discussed above with respect to the FIG. 10 configuration.

Single Shaft Hybrid Supercharger System

Figure 13:
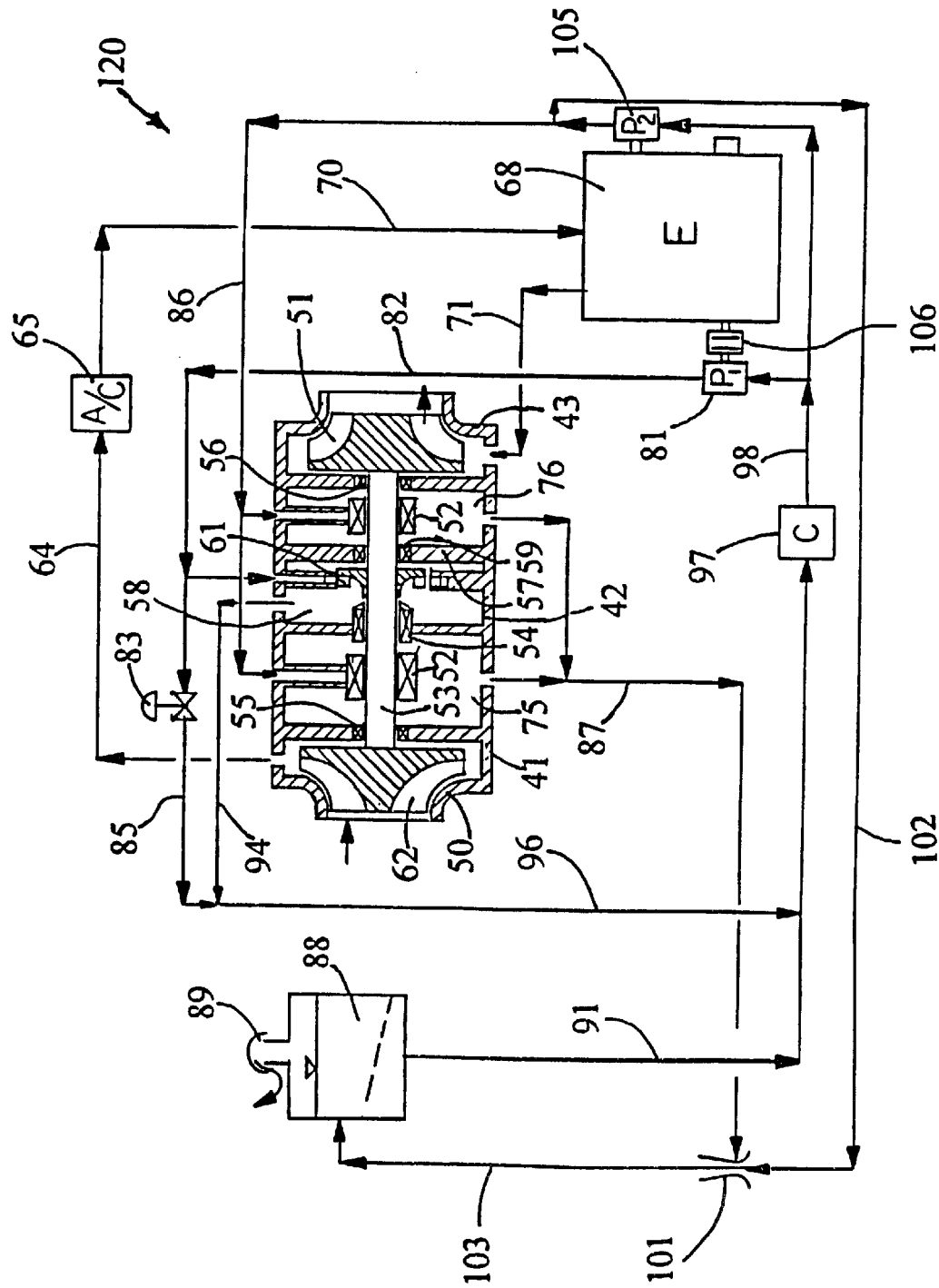
FIG. 13 is a drawing of a hybrid supercharger.
Figure 14:
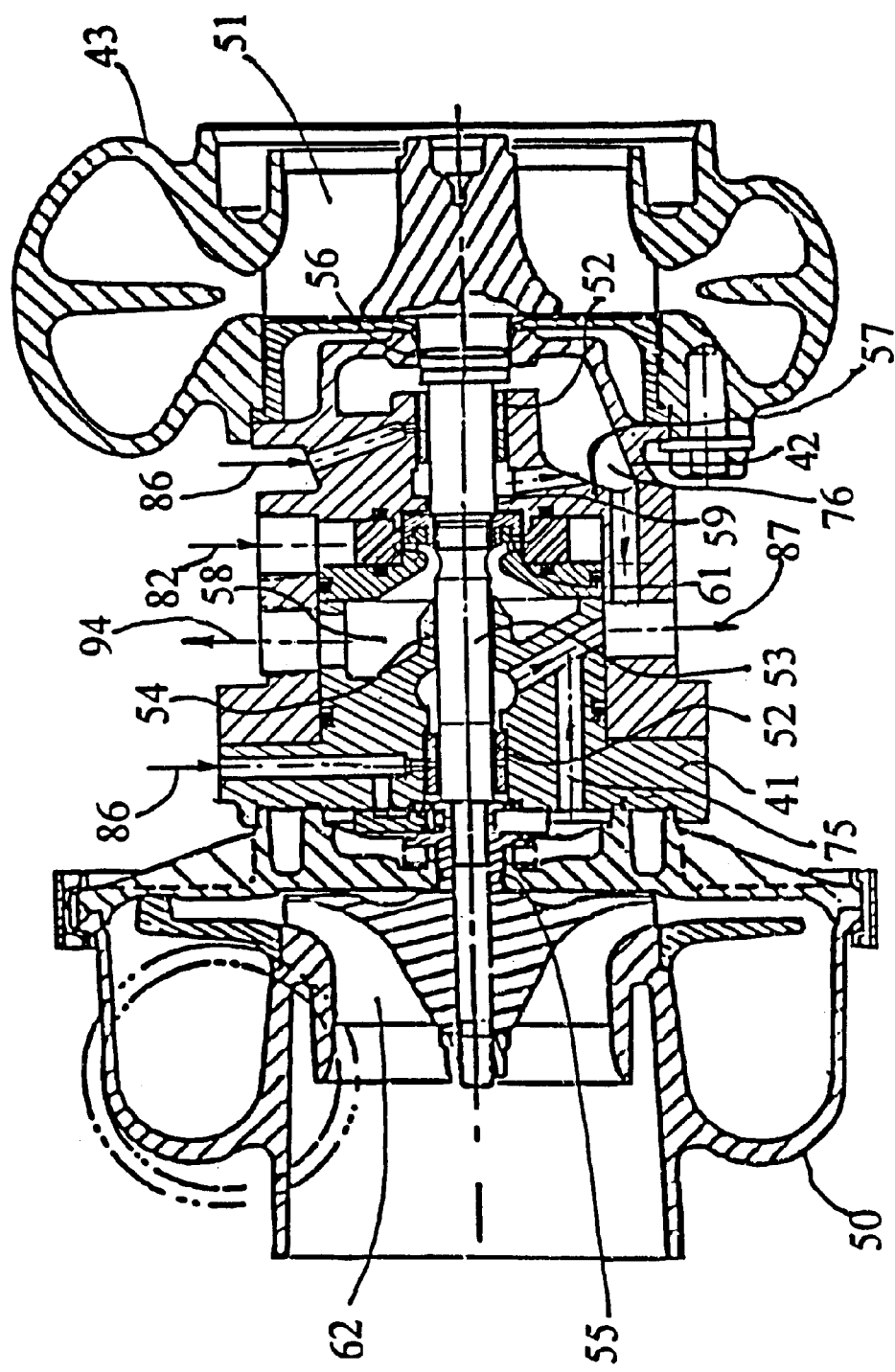
FIG. 14 shows some details of the FIG. 13 system.

FIG. 13 shows a hybrid supercharger system 120 supercharging internal combustion engine 68 and FIG. 14 shows a portion of the system in greater detail. In this embodiment compressor wheel 62 is driven on a single shaft by engine exhaust turbine 51 and by hydraulic turbine 61. Engine exhaust is provided to turbine 51 by exhaust line 71 and hydraulic fluid is provided to hydraulic turbine 61 by hydraulic pump 81 driven by the engine shaft.

Engine Exhaust Turbine

Engine exhaust turbine 51 is a standard turbocharger turbine such as the turbine portion of the TO4B-V turbocharger. It is driven as stated above by engine exhaust from engine 68 through exhaust pipe 71 and the exhaust from the turbine is to the ambient.

Supercharger Compressor

Compressor 62 is a standard turbocharger compressor again such as the compressor portion of the TO4B-V turbocharger. The exhaust from compressor 62 is directed through line 64, air to air aftercooler 65, and line 70 into the intake manifold of engine 68.

Hydraulic Inflow Radial Turbine

Figure 1:
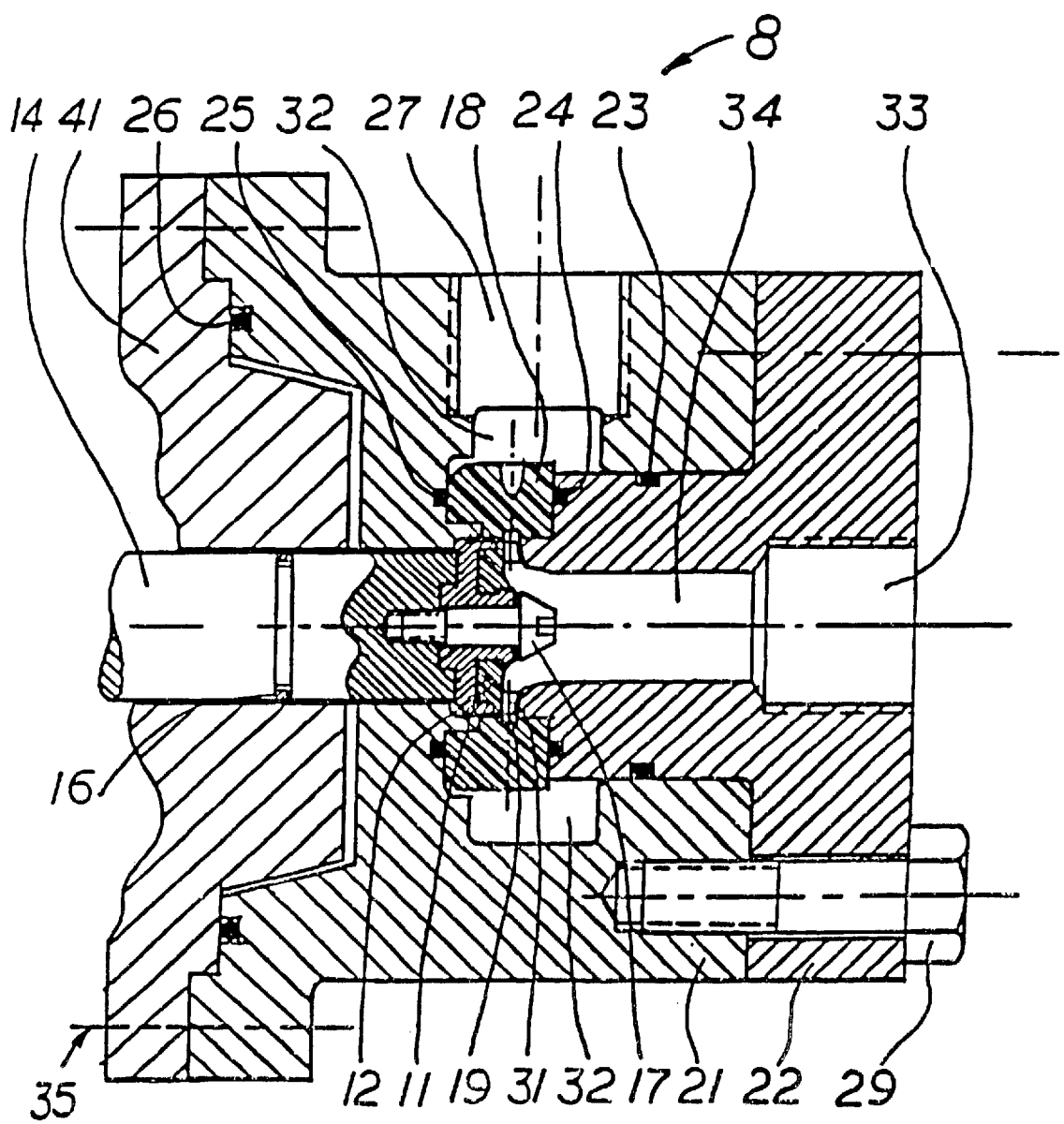
FIG. 1 is a cross sectional drawing showing a preferred embodiment of a very high speed turbine drive.

Hydraulic turbine 61 in this embodiment shown in FIG. 14 is similar to the hydraulic inflow radial turbine described in FIG. 1. The FIG. 14 turbine is a turbine with a wheel of only 0.800 inch diameter with the capability of generating 9.6 HP at 69,750 RPM, with pressure differentials of 930 psi and having the capability of operating at the fluid temperatures of 150 to 250 degrees Fahrenheit. As shown in FIGS. 13 and 14 hydraulic turbine 16 is solidly coupled to shaft 53 and supported rotatably by bearings 52. On one end of shaft 53 turbine wheel 51 is attached and on the other end of shaft 53 compressor wheel 62 is attached. During engine operation engine exhaust drives turbine 51 is transferring power to compressor wheel 62 through shaft 53. When additional engine power is required high pressure hydraulic fluid is supplied via line 82 to turbine 61 which augments the power produced by turbine 51. This additional power increases the rotational speed of shaft 53 and compressor wheel 62 producing increased air flow which is supplied to engine 68 via line 64 aftercooler 65 and line 70.

Pump 81 driven by engine 68 through coupling 106 supplies high pressure fluid to hydraulic turbine 61 via line 82. Similarly as in FIG. 10 bypass valve 83 allows hydraulic fluid to bypass hydraulic turbine 61 thus unloading pump 81. Sequential action directed by a controller (similar to the one shown in FIG. 10 but not shown in FIG. 13) allows coupling 106 to be connected and disconnected with virtually no load. Hydraulic fluid is discharged from turbine 61 via line 94 and from bypass valve 83 via line 85 into joint line 96 returning the fluid to pump 81 via oil cooler 97 and line 98.

Pump 105 supplies hydraulic fluid to bearings 52 via line 86. Pump 105 has substantially smaller capacity and produces substantially lower pressure than pump 81. It can be driven directly by the shaft of engine 68 as shown in FIG. 12 or by a small electric or hydraulic motor. Hydraulic fluid supplied to bearings 52 drains into cavities 75 and 76 along with a relative small amount of air leaking through shaft seal 55 from compressor wheel 62 and a relatively small amount of exhaust gas leaking from turbine wheel 51 through shaft seal 56. Mixture of hydraulic fluid and gas bubbles is channeled further to venturi type jet pump vial line 87.

About 50 percent of the total hydraulic fluid flow of pump 105 is channeled to venturi type jet pump 101 via line 102 where it is used to jet pump the hydraulic fluid-gas mixture supplied by line 87. The hydraulic fluid-gas mixture is scavenged into hydraulic tank 88 via line 103. Gas phase is allowed to separate and vent outside tank 88 through breathing cap 89. Alternatively, this gas phase can be reintroduced back into the intake of compressor 62 through a line not shown and be further consumed by engine 68. Following gas separation in tank 88 hydraulic fluid is returned via line 91 to the main hydraulic flow returning via line 96 and further through oil cooler 97 and line 98 to pump 81 and pump 105. In this preferred embodiment pump 81 has a capacity of 22 GPM at a pressure of 1200 psi and pump 105 has a capacity of 2.0 GPM at a pressure of 80 psi.

Sharing Hydraulic Fluid Drive System

Figure 15:
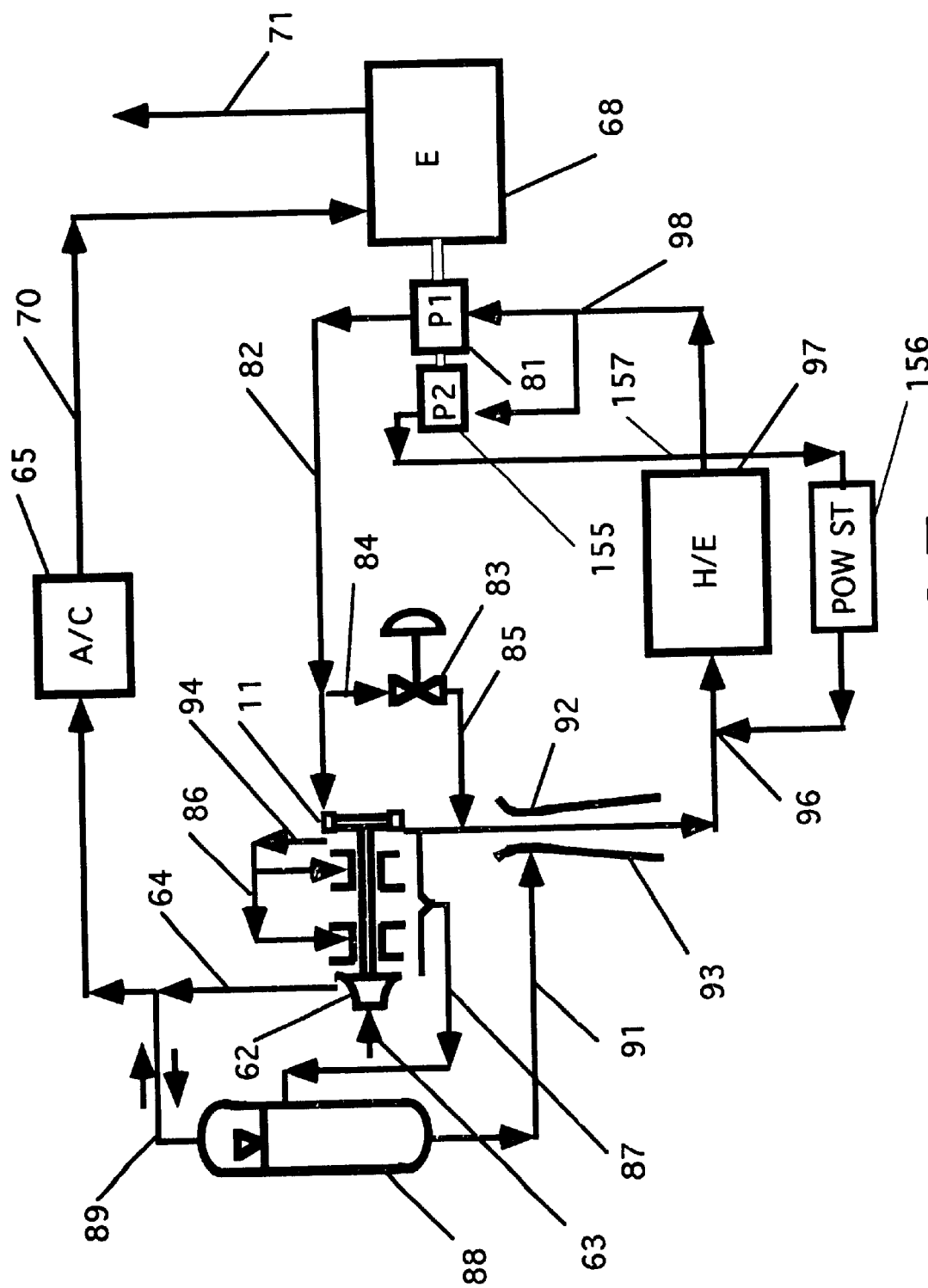
FIG. 15 shows a hydraulic turbine driven supercharger device using a hydraulic fluid system in common with a hydraulic driven power steering device.

One potential disadvantage of a hydraulic fluid driven supercharger system is that it requires hydraulic fluid drive system. This potential disadvantage is minimized if the motor vehicle already has a hydraulic fluid drive system, such as for powering a power steering system. A combined system could be utilized for new or existing vehicles. However, often the pressure requirements for different hydraulic devices are different. For example, power steering pumps utilized for typical truck and bus applications require maximum oil pressures of 2000 to 2500 psi and oil flow rates of 2 to 4 gallons per minute. Maximum pressure for driving the hydraulic supercharger turbine is optimally 900 to 1400 psi at flow rates of 18 to 22 gallons per minute. A combined system dealing with these different requirements is shown in FIG. 15. The fluid for the supercharger turbine is provided by pump 81 and the fluid for the power steering is provided by pump 155. In this preferred embodiment both pumps are commercially available as a single body double pump Model G5-25-6 manufactured by John S. Barnes Corporation, Rockford, Ill. Both pumps are supplied with hydraulic fluid via line 98. Lines 158 channels the hydraulic flow from the power steering mechanism 156 via line 157. Line 158 channels the hydraulic flow from power steering mechanism into line 96 where it mixes with hydraulic fluid exiting venturi nozzle 93, further flows through oil cooler 97 and via line 98 back into pumps 81 and 155.

Improved Turbine Design

Figure 16:
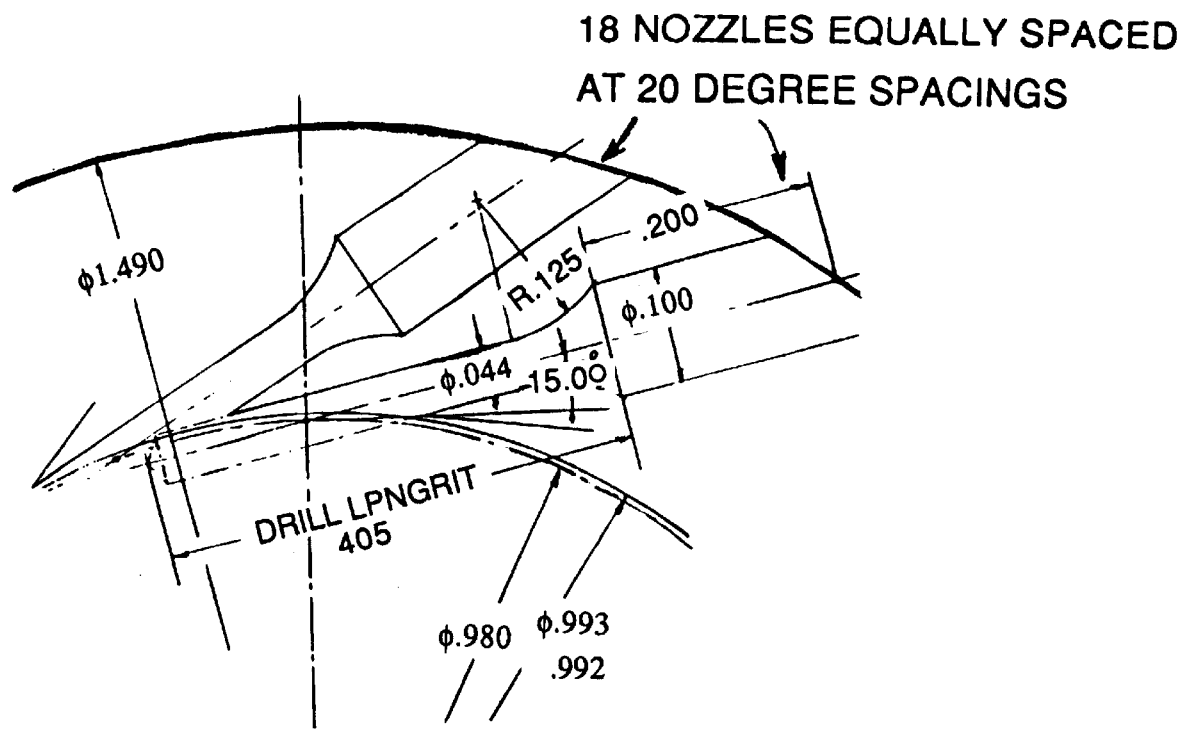
FIG. 16 shows a novel nozzle body design.
Figure 17:
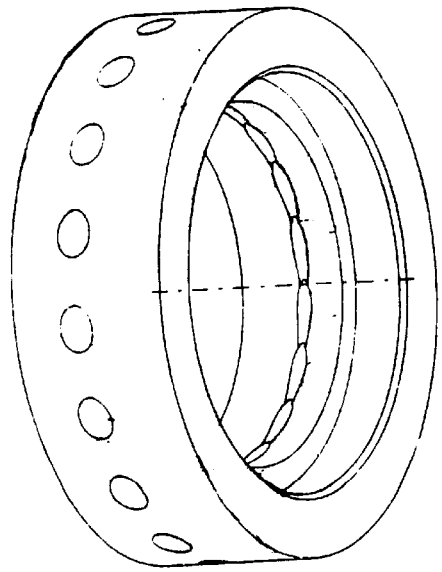
FIG. 17 is a prospective view of the FIG. 16 nozzle body.

FIGS. 3 and 4 show a preferred nozzle body configuration which is described above. An alternate design is shown in FIGS. 16 through 19. In this alternate design the angle of the nozzle is changed slightly and the total nozzle flow area has remained approximately the same while the individual nozzle throat diameters have been decreased and the number of nozzle holes has been increased to the point where the nozzle exit holes are overlapping each other by about 22 percent of the peripheral length of each nozzle exit. FIG. 16 shows the 18 nozzles configuration in the preferred embodiment with nozzle angles of 13 degrees to the tangent on a diameter of 0.993 inch with a 0.044 inch individual nozzle throat diameter. FIG. 17 shows a perspective view of the nozzle body with individual nozzles overlapping each other by about 20 percent. FIGS. 18 and 19 show new improved turbine wheel blades configured for higher efficiency. More uniform distribution of nozzles flow and and nozzles flow angle around the turbine wheel periphery provides for a more uniform inlet flow angle into the rotating turbine blades which allows for a sharper turbine blades leading edges and lower blade losses without potential flow separation at the blade inlets. Combination of overlapping nozzles and the new turbine wheel blades as compared to nozzles shown in FIG. 3 and turbine blades shown in FIG. 9 has produced an approximately 7 percent increase in the overall efficiency of the supercharger. I have determined that exits holes overlaps of between about 20 to 25 percent provides best results. Of course separate pumps could be utilized and separate pumps would be preferred is a clutch is to be provided to disengage to pump supplying the supercharger as discussed above.

It should be understood that the specific form of the invention illustrated and described herein is intended to be representative only, as certain changes may be made therein without departing from the clear teachings of the disclosure. If a clutch is provided to disconnect pump 81 in the case of the hybrid supercharger embodiment, an alternative method of lubricating the supercharger bearings must be provided. Compressor units other than that of Turbonetics could be used for superchargers. Turbine wheels with diameters as low as 0.350 inch and as large as 2.0 inches could be utilized effectively under the teachings of this invention with the diameter of the nozzle exit surface slightly larger. The number of turbine blades could be increased or decreased within the range of about 18 to 40. With changes obvious to persons skilled in the art, the unit described above could be driven with other fluids such as water. Nozzle angles as small as 8 degrees and as large as 30 degrees could be used. The hydraulic system configurations shown in FIGS. 10, 11, 12, and 13 can be improved by employing a variable displacement piston pump, such as Vickers Model PVB15RSY-31-CM-11 in which case the bypass valve 83 could be eliminated. Alternately, a second bypass valve could be added in parallel with valve 83 in order to provide a better stepwise control of the hydraulic systems shown in FIGS. 10, 11, 12 and 13. Accordingly, reference should be made to the following appended claims in determining the full scope of the invention.

I claim:

1. An hydraulic supercharger system for supercharging an internal combustion engine defining a shaft comprising:
   (a) a supercharger comprising:
      i) a shaft defining a shaft axis and supported by supercharger bearings,
      ii) a high speed hydraulic radial inflow turbine drive comprising:
         (1) a turbine nozzle body defining a turbine nozzle body outlet surface and comprising a hydraulic fluid cavity and a plurality of nozzles each of said nozzles providing a passageway for hydraulic fluid to pass inwardly from said hydraulic fluid cavity to said outlet surface and defining a nozzle centerline, where each of said nozzle centerlines:
            (A) intersects said turbine body outlet surface at a point of intersection on a circle is concentric about said shaft axis and defines a nozzle exit circle and
            (B) forms an angle of about 8 to 30 degrees with a tangent to said nozzle exit circle at said point of intersection,
         (2) a radial in-flow hydraulic turbine wheel assembly comprising a plurality of radial flow turbine blades on a blade circle having a diameter of less than 2 inches; said turbine wheel assembly being arranged in relation to said shaft and said turbine body outlet surface such that hydraulic fluid discharged from said nozzles impinge on said blades to cause rotation of said turbine wheel and said shaft,
      iii) a compressor driven by said hydraulic turbine drive,
   (b) a first hydraulic pump driven by said shaft supplying hydraulic fluid of a hydraulic fluid system to said supercharger,
   (c) a second hydraulic pump driven by said shaft supplying hydraulic fluid of said hydraulic fluid system to an hydraulic device other than said supercharger,
   (d) an hydraulic venturi unit defining a main inlet, an outlet and a low pressure throat section,
   (e) an expansion tank,
   (f) a main hydraulic piping means providing an hydraulic circulation loop for hydraulic fluid to flow from said pump, to drive said hydraulic turbine drive, to said main inlet of said venturi unit, through said venturi unit, to said venturi outlet and back to said pump,
   (g) a supercharger bypass system comprising a controlled bypass valve and a piping means to permit a portion of said hydraulic fluid flow to bypass said supercharger turbine drive, and
   (h) a lubrication piping means providing a lubrication route for a portion of said hydraulic fluid flow from said turbine drive to said bearings to said expansion tank and to said low pressure throat section of said venturi unit.

2. A system as in claim 1 wherein said hydraulic device other than said supercharger is a power steering mechanism.

3. A system as in claim 1 and further comprising a clutch for engaging and disengaging said first pump from said shaft.

4. A system as in claim 3 and further comprising a controller for controlling the operation of said bypass valve and said clutch.

5. A system as in claim 1 and further comprising an oil cooler located within said hydraulic circulation loop.

6. A hybrid supercharger system as in claim 4 and further comprising a second hydraulic pump for providing hydraulic fluid to said supercharger bearings.

7. An hybrid supercharger system as in claim 5 and further comprising a second hydraulic pump for providing hydraulic fluid to said supercharger bearings.

8. An hybrid supercharger system for supercharging an internal combustion engine defining an engine shaft and engine exhaust comprising:
   (a) a hybrid supercharger comprising:
      i) a supercharger shaft defining a supercharger shaft axis and supported by supercharger bearings,
      ii) a high speed hydraulic radial inflow turbine drive driven by hydraulic fluid pressurized by said first pump, said hydraulic inflow turbine drive being mounted on said shaft in order to rotate said shaft,
      iii) an engine exhaust turbine drive driven by said engine exhaust, said engine exhaust turbine drive being mounted on said supercharger shaft in order to rotate said supercharger shaft, and
      iv) a compressor mounted on said supercharger shaft and driven by said hydraulic turbine drive and said engine exhaust turbine drive,
   (b) a first hydraulic pump driven by said shaft supplying hydraulic fluid of a hydraulic fluid system to said supercharger, and
   (c) a second hydraulic pump driven by said shaft supplying hydraulic fluid of said hydraulic fluid system to an hydraulic device other than said supercharger.

9. An hydraulic supercharger system for supercharging an internal combustion engine defining a shaft comprising:
(a) a supercharger comprising:
   i) a shaft defining a shaft axis and supported by supercharger bearings,
   ii) a high speed hydraulic radial inflow turbine drive comprising:
      (1) a turbine nozzle body defining a turbine nozzle body outlet surface and comprising a hydraulic fluid cavity and a plurality of nozzles each of said nozzles providing a passageway for hydraulic fluid to pass inwardly from said hydraulic fluid cavity to said outlet surface and defining a nozzle centerline where:
         (A) each of said nozzle centerlines:
            (i) intersects said turbine body outlet surface at a point of intersection on a circle is concentric about said shaft axis and defines a nozzle exit circle and
            (ii) forms an angle of about 8 to 30 degrees with a tangent to said nozzle exit circle at said point of intersection, and
         (B) each of said nozzles define an exit peripheral length on said nozzle exit circle and said peripheral length of each nozzle overlaps a peripheral length of an adjacent nozzle defining an exit overlap length,
      (2) a radial in-flow hydraulic turbine wheel assembly comprising a plurality of radial flow turbine blades on a blade circle having a diameter of less than 2 inches; said turbine wheel assembly being arranged in relation to said shaft and said turbine body outlet surface such that hydraulic fluid discharged from said nozzles impinge on said blades to cause rotation of said turbine wheel and said shaft,
   iii) a compressor driven by said hydraulic turbine drive,
(b) a first hydraulic pump driven by said shaft supplying hydraulic fluid of an hydraulic fluid system to said supercharger,
(c) an hydraulic venturi unit defining a main inlet, an outlet and a low pressure throat section,
(d) an expansion tank,
(e) a main hydraulic piping means providing a hydraulic circulation loop for hydraulic fluid to flow from said pump, to drive said hydraulic turbine drive, to said main inlet of said venturi unit, through said venturi unit, to said venturi outlet and back to said pump,
(f) a supercharger bypass system comprising a controlled bypass valve and a piping means to permit a portion of said hydraulic fluid flow to bypass said supercharger turbine drive, and
(g) a lubrication piping means providing a lubrication route for a portion of said hydraulic fluid flow from said turbine drive to said bearings to said expansion tank and to said low pressure throat section of said venturi unit.

10. A supercharger system as in claim 9 wherein said exit overlap lengths of each of said nozzles are about 20 percent of said exit peripheral lengths.

11. A supercharger system as in claim 9 and further comprising a second hydraulic pump driven by said shaft supplying hydraulic fluid of said hydraulic fluid system to an hydraulic device other than said supercharger.

\* \* \* \* \*